Aug. 28, 1923.

1,466.544

F. PALOMBO

SPRING WHEEL

Filed Oct. 27, 1922

Inventor
FAUSTINO PALOMBO

Witnesses:
W. Himebaugh
J.W. Foster

By Mumm & Co.
his Attorneys

Patented Aug. 28, 1923.

1,466,544

UNITED STATES PATENT OFFICE.

FAUSTINO PALOMBO, OF BEDFORD, OHIO.

SPRING WHEEL.

Application filed October 27, 1922. Serial No. 597,309.

*To all whom it may concern:*

Be it known that I, FAUSTINO PALOMBO, a citizen of the United States, and a resident of Bedford, in the county of Cuyahoga and State of Ohio, have invented a new and Improved Spring Wheel, of which the following is a full, clear, and exact description.

This invention relates to improvements in spring wheels, an object of the invention being to provide an improved arrangement of springs and mounting therefor whereby all of the springs function to cushion the load at all times and give the maximum resiliency and strength with the minimum of weight.

A further object is to provide a spring wheel having a series of bow springs interposed between the inner and outer members of the wheel, said springs having fixed relation to one member and at their ends having movable or rolling engagement with the other member whereby the springs can take varying positions in accordance with the strains and stresses put thereon.

A further object is to provide a spring wheel in which resiliency is provided by a plurality of leafed bow springs, the intermediate portions of which are fixed to one member of the wheel and the end portions of the springs have rolling engagement with arcuate tracks on the other member.

A further object is to provide a spring wheel of the character stated in which a sectional core preferably of wood is provided in the shoe or tire of the wheel so as to reduce the weight to a minimum and provide a puncture proof tire.

A further object is to provide a spring wheel of the character stated which can be manufactured and sold at a reasonably low price, which will be neat and attractive in appearance, which will be relatively light in weight and which will most efficiently perform the functions for which it is intended.

With these and other objects in view, the invention consists in certain novel features of construction and combinations, and arrangement of parts, as will be more fully hereinafter described and pointed out in the claims.

In the accompanying drawings—

Figure 1:
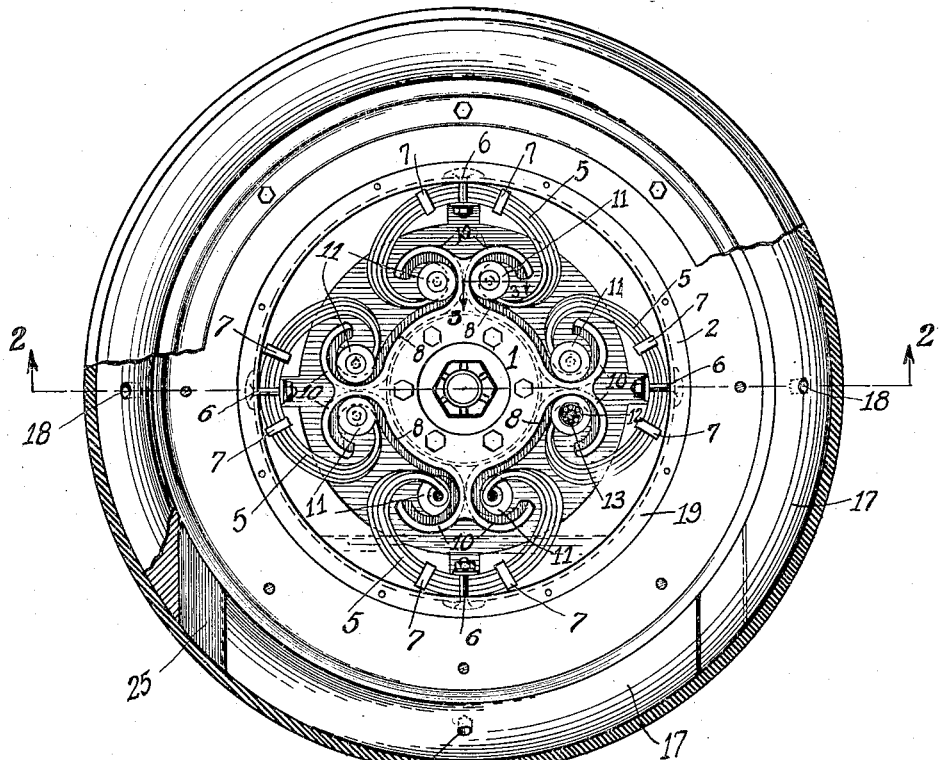
Figure 1 is a view partly in elevation but mainly in longitudinal section illustrating my improved spring wheel.
Figure 2:
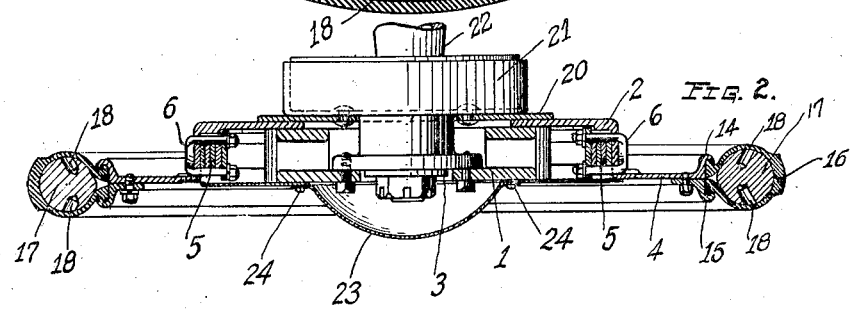
Figure 2 is a view in transverse section on the line 2—2, of Figure 1.
Figure 3:
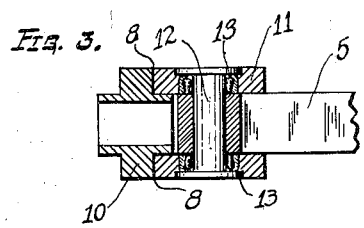
Figure 3 is an enlarged view in transverse section showing the mounting of one end of one of the springs.

1 and 2 represent the inner and outer members of my improved spring wheel. The inner member 1 is of general circular or cylindrical form, and is secured to the axle 3 in any desired manner, and in fact, it is the purpose of my invention to so construct this inner member 1 as to make it conform to standard axle construction and allow it to be positioned on any ordinary automobile axle.

The outer member 2 constitutes a casing circular or cylindrical in form and having an integral web 4 at its outer portion to give the wheel the necessary diameter.

Between the inner and outer members 1 and 2 a series of springs 5 are interposed. These springs 5 I shall hereinafter refer to as bow springs, although they are preferably composed of a plurality of leaves and a preferable form is to provide each spring with leaves of varying lengths, but it is to be understood of course, that my invention is not limited to the exact form of the spring except that it is of general bow shape with its intermediate portion fixed by a U bolt or other securing device 6 to the outer member 2, and having clamping bands 7 thereon to hold the leaves in proper assemblage.

The inner member 1 is formed at its edges with grooves constituting tracks 8, and these grooves or tracks 8 are extended by arcuate enlargements 10 on the member 1 so that the tracks, at their terminals, are curved in the arc of a circle with said arcuate terminals opposed to each other.

The springs 5 at their ends, are provided with rollers 11 which run on the arcuate portions of the tracks, and these rollers 11 are connected by suitable journals 12 with anti-friction bearings 13 interposed between the same and the rollers, to reduce friction to a minimum.

It is to be understood of course, that the invention is not limited to the particular construction and mounting of the rollers, as this may be varied to suit the trade, the only essential being that the rollers are so positioned as to run freely on the tracks and to compensate for varying positions of the ends of the springs to properly function in sustaining the load, and in absorbing the shocks imparted to the wheel.

The web 4, constituting the outer portion of the wheel is made with a clincher rim section 14 and a removable clincher rim section 15 to secure a shoe 16 thereon and permit its removal as occasion may require.

Within the shoe 16 I locate a plurality of core sections 17, these sections 17 are preferably of wood for lightness and cheapness, and they have tongue and groove sections as shown at 25.

Furthermore, I would call attention to the fact that the lines of juncture between the sections 17 are parallel with the diameter of the wheel, so that the sections can be readily drawn out of the shoe one at a time, or replaced in the shoe in assembling.

To facilitate the manipulation of the sections 17 I provide angular notches 18 in the sides thereof, and these notches are adapted to receive a suitable tool to facilitate the movement of the section.

The casing portion or member 2, of the wheel is adapted to contain oil or other lubricant 19 in its lower portion which splashes around inside of the wheel and maintains all of the parts properly lubricated. To prevent the escape of this oil, and also to prevent the entrance of dirt and grit into the wheel, I provide a closure disk 20 against the inner face of the wheel, which is secured to the brake drum or other portion 21 of the axle housing 22, and on the outside of the wheel I provide a removable hub plate 23 which is fixedly and removably secured to the casing by means of screws 24 or in any other approved manner.

In operation the load and the jars imparted to the wheel cause the members 1 and 2 to move relative to each other. The springs 5 sustain this load and absorb the jars, all the springs functioning at all times, but due to the varying positions of the springs as the wheel turns, the several springs will receive different torsional strains so that their ends will bend and this varying bending action of the ends of the springs is permitted by reason of the fact that they have a rolling engagement on arcuate tracks of the inner member, and the ends of the springs are therefore more or less free to move and to give the proper support, yet permit the varying bending actions to which they are subjected without injury to themselves or to their mounting.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

I claim:

1. A spring wheel, comprising an inner member, an outer member, bow springs interposed between the members, and at their intermediate portion secured to one member, and at their ends having movable engagement with the other member, and arcuate tracks on the last mentioned member guiding the movement of the ends of the springs.

2. A spring wheel, comprising an inner member having a plurality of opposed pairs of arcuate tracks, an outer member, bow springs fixed at their intermediate portions to the outer member, and at their inner ends movable on the arcuate tracks of the inner member.

3. A spring wheel, comprising an inner member having a plurality of opposed pairs of arculate tracks, an outer member, bow springs fixed at their intermediate portions to the outer member, and rollers on the ends of the springs mounted to roll on the arcuate tracks of the inner member.

4. A spring wheel, comprising an inner member having a plurality of opposed pairs of arcuate tracks, an outer member, bow springs fixed at their intermediate portion to the outer member, rollers at opposite sides of the ends of the springs having roller bearing mounting on the springs and engaging the arcuate tracks.

5. A spring wheel, comprising inner and outer members, outwardly and laterally projecting portions on said inner member, bow springs secured at their intermediate portions to the outer member, said springs having inwardly projecting free ends positioned under the said outwardly and laterally projecting portions of the inner member.

FAUSTINO PALOMBO.